United States Patent [19]

Steiner

[11] Patent Number: 4,726,427
[45] Date of Patent: Feb. 23, 1988

[54] SOIL LOOSENING DEVICE

[76] Inventor: Walter Steiner, Saentisstrasse 52, CH-8311 Bruetten, Switzerland

[21] Appl. No.: 900,570

[22] Filed: Aug. 26, 1986

[30] Foreign Application Priority Data

Apr. 21, 1986 [EP] European Pat. Off. ........ 86105501.0

[51] Int. Cl.$^4$ .......................... A01B 1/00; A01B 36/06
[52] U.S. Cl. ...................................... 172/41; 172/49.5; 74/50; 74/109
[58] Field of Search ...................... 172/49.5, 41, 54.5, 172/42, 59, 43, 61, 111; 74/50, 109

[56] References Cited

U.S. PATENT DOCUMENTS

| | | | |
|---|---|---|---|
| 1,180,134 | 12/1979 | van der Lely | 172/54.5 |
| 2,625,867 | 1/1953 | Hands | 172/41 |
| 2,787,111 | 4/1957 | Templeton | 74/50 X |
| 3,513,917 | 5/1970 | Stober | 172/42 |
| 4,003,436 | 1/1977 | Foster | 172/41 |
| 4,213,504 | 7/1980 | Schneider | 172/41 |

FOREIGN PATENT DOCUMENTS 7421464 6/1975 France .
745671 2/1956 United Kingdom .............. 172/54.5

Primary Examiner—Richard J. Johnson
Attorney, Agent, or Firm—Reed Smith Shaw & McClay

[57] ABSTRACT

The soil loosening device has at least one, preferably two journals protruding downwardly from a supporting body, which are driven to a pivotal motion along a limited angle. Tine-like soil loosening tool members in bifurcate arrangement, to be driven along a circle segment, are mounted on the journals. The driving unit for driving the tools is characterized by its simple design since it consists of only a few, reliably guided and sturdy components. Particularly, there is provided a crank shaft which drives a toothed rack member to an oscillating motion. Gear wheels connected to the journals mesh with the toothed rack member. Accordingly the expenditure in manufacturing the device is low and the device has a high resistance to wear. The driving unit of the device may be attached to the supporting body in different angular positions by means of a coupling device.

11 Claims, 12 Drawing Figures

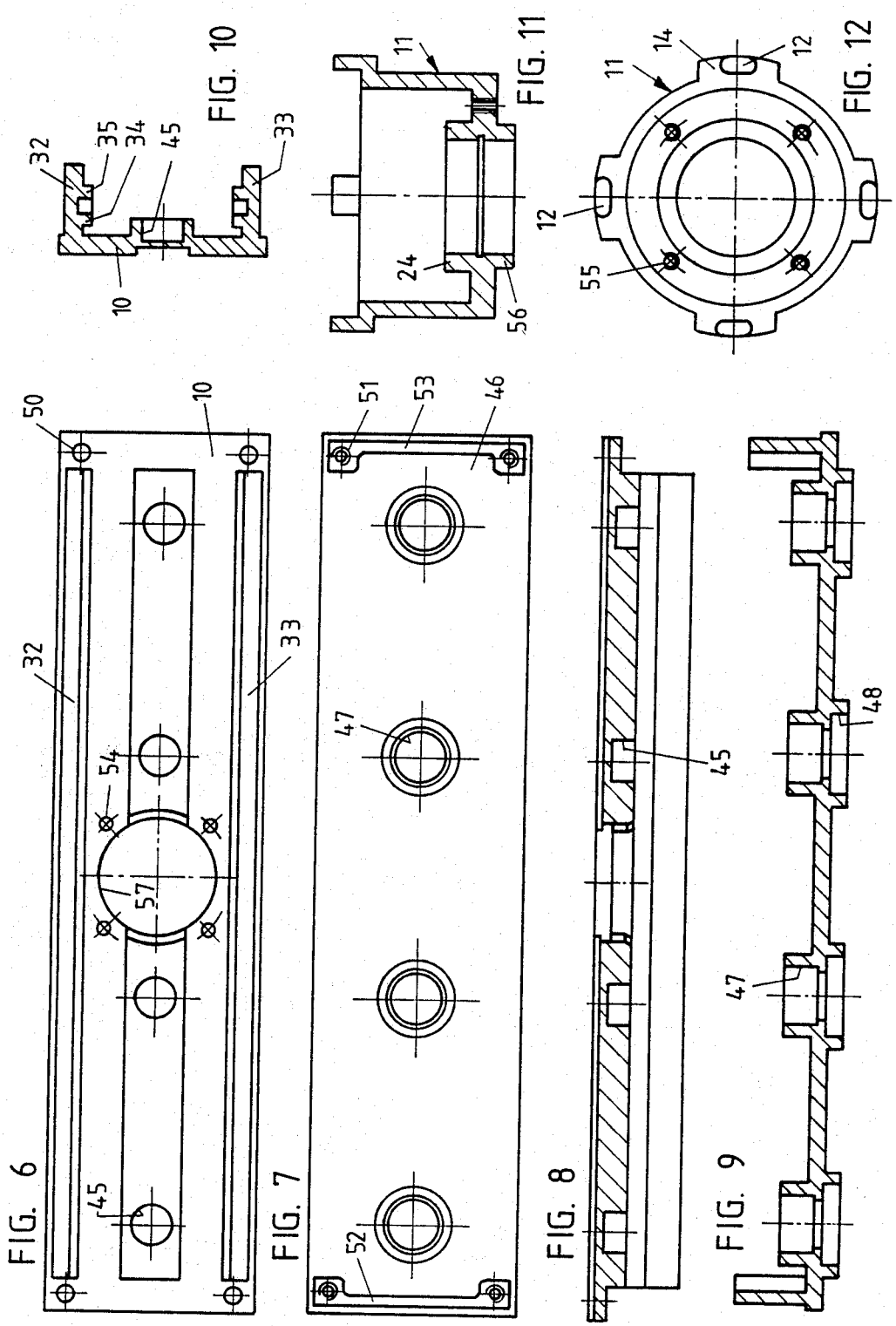

SOIL LOOSENING DEVICE

BACKGROUND OF THE INVENTION

The present invention generally relates to gardening and farming. Specifically, the present invention relates to a soil loosening device, particularly to a device for loosening the surface layers of the soil, having a supporting body for at least one downwardly protruding soil loosening tool and for receiving a motorized driving unit which is drivingly coupled to the soil loosening tool by means of a gearing contained in the supporting body.

The device of the present invention is suitable for the backyard gardener, but also for commercial use and allows to loose the surface of the soil in flower beds and vegetable gardens etc. in a simple, effortless way in order to achieve an improved aerating of the soil and a cultivation thereof.

Even a laymen which does not have much knowledge of horticultural science knows that the soil of flower beds, vegetable beds etc. has to be loosened from time to time. This work is especially laborious to do by hand, e.g. by means of a rake, and requires not only a remarkable effort, but also plenty of time.

PRIOR ART

However, motor driven rakes comprising rotating blade-like rake elements are known which are quite useful to effortlessly perform this work. Such generally known motorized rakes usually are big, heavy and expensive and are primarily useful to cultivate large, continuous areas. To use such devices in flower beds or vegetable beds is precluded not only in view of their size and weight, but also because the loosening effect of the rotating rake elements is to intensive and nearly uncontrollable in most cases.

In order to avoid these disadvantages, a simplified soil loosening device of the kind referred to has been disclosed in French Pat. No. 74 21 464, which comprises a pair of double tines driven in oppositely directed motion which are intended to loosen the soil, particularly the surface layer thereof. The driving of the journals of these double tines is thereby accomplished, starting from a gear wheel connected to the driving shaft of the motor, by further gear wheels which are connected, via a crank gear, to driving discs which in turn are mounted on the journals of the double tines. Consequently the gear unit consists of a great number of components which have to be machined with a high degree of precision; it is thereby costly to manufacture, heavy in weight and subject to a rapid wear since high forces have to be transmitted.

A further disadvantage of this known device may be seen in the fact that a modification in the sense of an extension of the soil loosening device, in order to work the soil in a larger area or, alternatively, more intensively, is hardly possible or only with difficulties without having to redesign the known device completely. Under some circumstances it might be desirable to use four double tines in a row in order to loosen a wide, large area of the soil in one step, particularly if the soil is already more or less loose. It is expected that a redesign of the device disclosed in said French Patent for that purpose would require even more constructive expenditure.

OBJECTS OF THE INVENTION

It is an object of the present invention to provide a soil loosening device of the kind referred to which may be manufactured easily and less costly due to its simple design. It is a further object of the invention to provide a soil loosening device of the kind referred to which is less subject to wear and which may be designed, without the need to change the basic structure, as a device comprising one, two or even four or more soil loosening tools.

SUMMARY OF THE INVENTION

The present invention is a device which loosens the soil near the surface of the earth as it moves along the surface. The device of this invention is particularly well suited for use in flower beds and vegetable gardens because its direction and depth as well as intensity of soil penetration can be easily controlled. The device of the invention is inexpensive and light in weight. This lightness and its compactness makes it especially adaptable for use in tight quarters, as is usually encountered in flower beds and vegetable gardens. The device is suitable for use by backyard gardeners as well as by professional farmers.

According to a first aspect of the invention, in order to meet the aforementioned objects, the invention provides a soil loosening device with a supporting body for at least one downwardly protruding, tine-like soil loosening tool and for a motorized driving unit which is drivingly connected to the soil loosening tool by means of a gearing received in the supporting body. The device of the invention comprises a handle for guiding and moving the device over the surface of the soil to be loosened.

The gearing comprises mechanical means for the transformation of the continuous rotary motion of the driving unit into an oscillating angular motion of journals which receive the soil loosening tool members in a bifurcate arrangement. These mechanical means comprise a toothed rack member slidingly received in the supporting body. The rack member is driven in an oscillating motion by a crank pin which is connected to the driving shaft of the driving unit and which engages an elongate recess in the rack member. A gear wheel connected to the driven journal of the tool meshes with a group of teeth provided on a driving leg of the toothed rack member.

According to a second aspect of the invention, in order to meet the above mentioned objects even better, the supporting body has a plurality of downwardly protruding, tine-like soil loosening tools which are supported by journals. At least two of said journals are driven in rotory motion in opposite directions. For this purpose, the toothed rack member slidingly received in the supporting body and driven to an oscillating motion has first and second groups of teeth, whereby gear wheels connected to the oppositely driven journals each mesh with these first and second groups, respectively, of teeth. The teeth of the first group of teeth, which mesh with the gear wheel connected to the journal driven in a first direction, are oppositely oriented to the teeth of the second group, which mesh with the gear wheel connected to the other journal driven to a second direction.

On the basis of such embodiments according to the invention it is not only possible to realize a very simple, thereby inexpensive as well as sturdy construction which is very wear resistant; furthermore it is possible in a simple manner, without the need of changing the basic design of the device, to drive four or even more soil loosening tools by means of a single driving shaft. It is merely necessary to provide a corresponding number of journals in the supporting body and to provide a corresponding number of groups of teeth on the toothed rack member which mesh with the corresponding gear wheels mounted on the journals.

Preferably the motorized driving unit is releasably connectd to the supporting body and may be mounted thereon, together with the handle which is connected thereto, in two different angular positions, particularly in line and transversely to the row of journals and to the loosening tools mounted on the journals, respectively. Thereby, it is achieved that a different degree of cultivation of the soil is possible when the device is pulled or pushed over the soil to be loosened: If the device is moved transversely to the row of the tools, a comparatively slight, but wide-spread loosening of the soil results; if the device is moved in line with the row of the loosening tools, a narrow but intensive loosening of the soil is realized. In addition the releasable mounting of the driving unit on the supporting body provides for a combination of the motorized driving unit also with other kinds of working tools and devices.

BRIEF DESCRIPTION OF THE DRAWINGS

In the following the invention will be further described with reference to some embodiments which are shown in the attached drawings, wherein:

FIG. 6 is a view of the lower side of the upper casing plate of the supporting body of the soil loosening device according to FIGS. 1 and 2;

FIG. 7 is a plan view of the upper side of the lower casing plate of the supporting body of the soil loosening device according to FIGS. 1 and 2;

FIG. 8 is a longitudinal sectional view of the casing plate of FIG. 6;

FIG. 9 is a longitudinal sectional view of the casing plate of FIG. 7;

FIG. 10 is a transverse sectional view of the casing plate of FIG. 6;

FIG. 11 is a cross sectional view of the coupling case connected to the upper casing plate, the scale being different from the one in FIGS. 6 to 10; and FIG. 12 is a plan view of the coupling case of FIG. 11.

DESCRIPTION OF PREFERRED EMBODIMENTS

Figure 1:
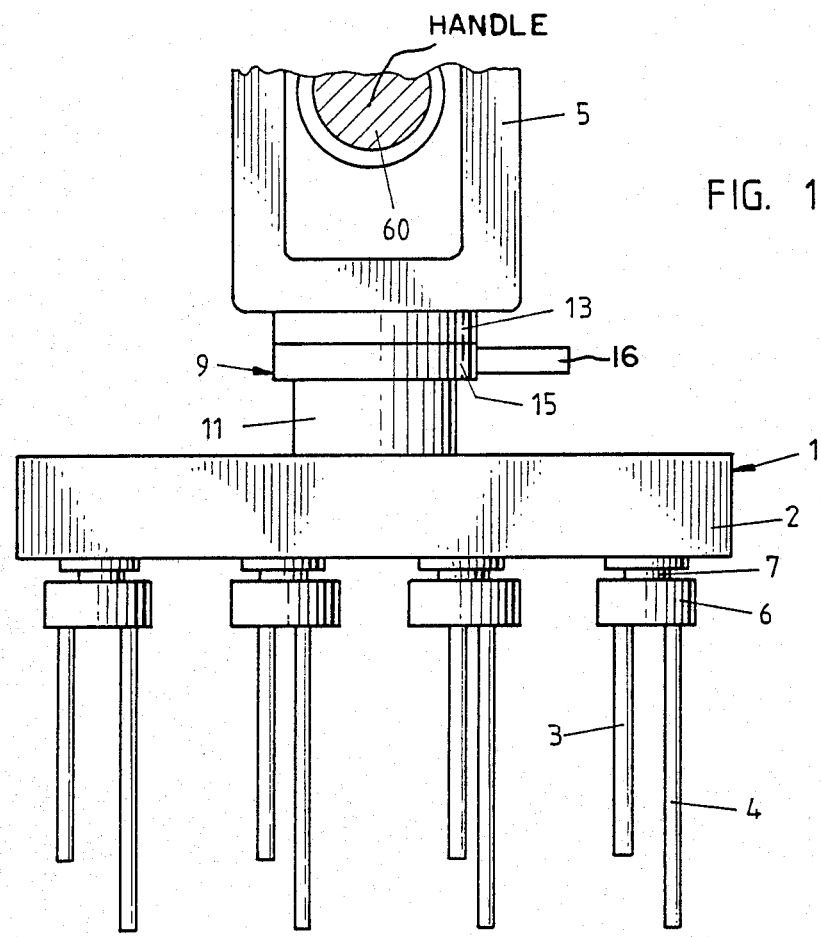
FIG. 1 is a side view of the soil loosening device, the motorized driving unit being but partly shown.
Figure 2:
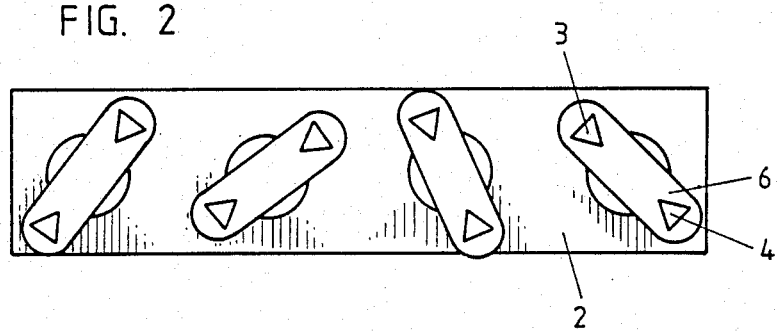
FIG. 2 is an underside view of the supporting body with the corresponding loosening tools.

As can be seen in FIG. 1, the soil loosening device 1 has a supporting body 2 which comprises on one side a number of tine-like, downwardly protruding soil loosening tool members 3 and 4, and on the other side a motorized driving unit 5, e.g. an electric motor.

Two of each of the tine-like loosening tool members 3 and 4 are mounted on a common tool support plate 6 which in turn is releasably connected to a journal 7 rotatably received in the supporting body 2. As fixing means for the mounting of the tool support plate 6 on the journal 7, there may be provided fixing screws (not shown) which extend transversely to the axis of the tool and the journal, respectively, and press against the latter or engage it. The soil loosening tool members 3 and 4, which are of uneven length in the example shown, may be integrally or also releasably connected to the tool support plate 6, e.g. by means of (not shown) clamping screws. Thereby the posibility is given to mount different loosening tools on the device in order to compensate for different soil qualities, either by exchanging a pair of tine-like tool members together with the tool support plate 6, or by exchanging some of the tool members 3 and 4, respectively.

The motorized driving unit 5 is releasably connected to the supporting body 2 by means of a coupling device 9. As can be seen from FIG. 3, the coupling device 9 includes a coupling case 11, rigidly connected to the upper casing plate 10. The coupling case 11 comprises four locking pins 12, arranged along the periphery of its opening and extending parallel to the axis of the driving shaft of the driving unit 5. The four locking pins 12 are adapted to engage correspondingly arranged recesses (not shown) on the coupling case 13 which is provided on the motorized driving unit 5 (FIG. 1). Thereby a non-rotating connection between the coupling case 11 and the coupling case 13 is realized. For a reliable fixing in axial direction, in the kind of a bayonet joint, four radial extensions 14 protrude outwardly from the coupling case 11 (see FIG. 12), which engage corresponding extensions, provided on a locking ring member 15 (see FIG. 1) and protruding radially inwardly. The locking ring member 15 comprises a handle 16 suitable for rotating the ring member 15 with reference to the motorized driving unit 5 and the coupling case 11 in order to lock or release the coupling.

Figure 3:
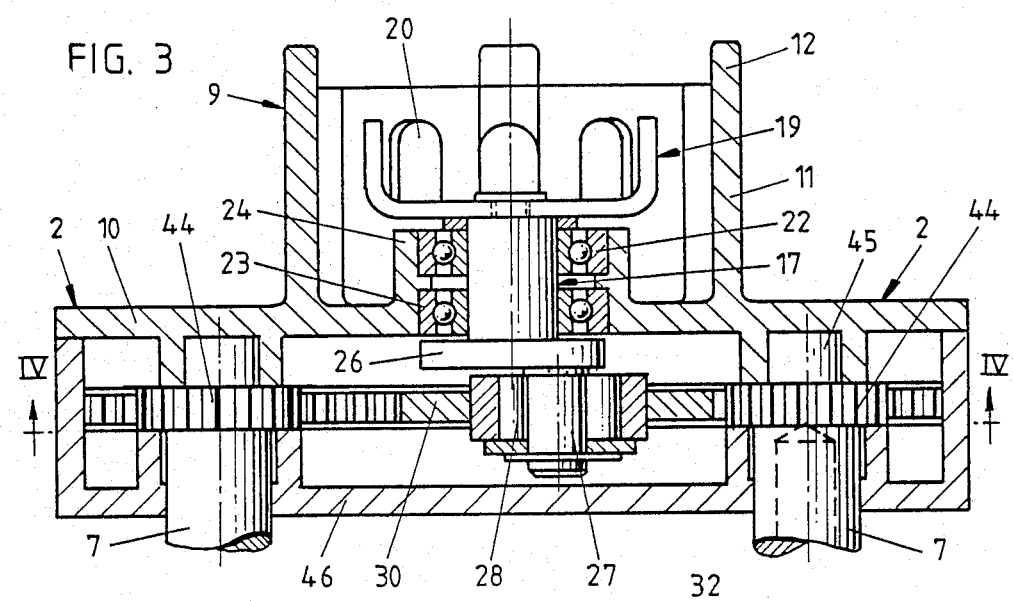
FIG. 3 is a cross sectional view of a soil loosening device without motorized driving unit and having only two journals.
Figure 4:
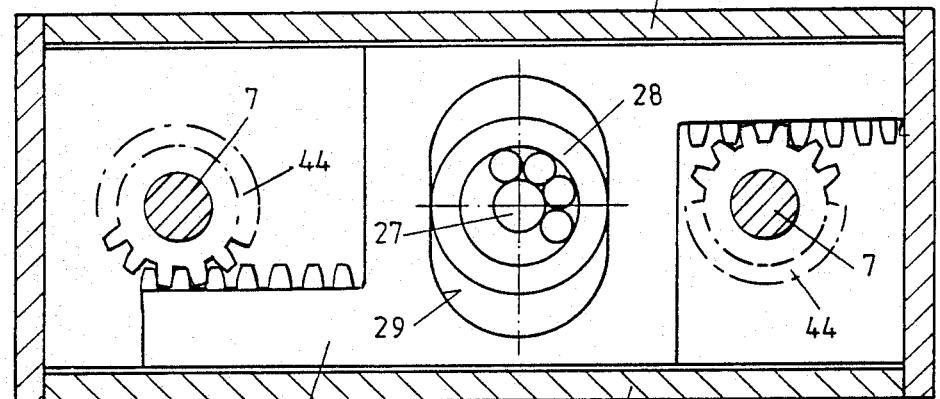
FIG. 4 is a cross sectional view of the supporting body, in a plane parallel to the toothed rack member, corresponding to the embodiment of FIG. 3.
Figure 5:
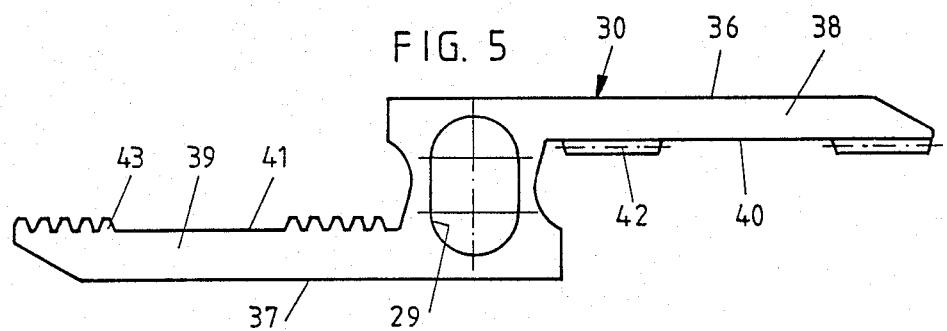
FIG. 5 is a plan view of the toothed rack member of the soil loosening device according to FIGS. 1 and 2, in a different scale.

As can be seen in FIG. 3, the driving connection between the driving shaft (not shown) of the driving unit 5 and a crank shaft 17 of the gearing contained in the casing of the supporting body 2 is realized by means of a claw clutch, the engaging part 19 thereof, which is mounted on the crank shaft 17, comprising a plurality of coupling claws 20, e.g. eight, which are arranged along a circle and extend parallel to the rotation axis. Upon engagement of the clutch by connecting the coupling case 11 to the coupling case 13, the coupling claws 20 are inserted in correspondingly arranged openings of a (not shown) counterpart of the clutch which is mounted on the driving shaft of the driving unit 5.

The crank shaft 17 is received in a hub 24 provided on the upper casing plate 10 (FIG. 3) or in a hub 25 provided on the coupling case 11 (FIG. 11) by means of two ball bearings 22 and 23 (not shown in FIG. 11). The crank disk 26 provided on the crank shaft 17 has a crank pin 27 offset with reference to the rotation axis which protrudes into the interior of the supporting body casing and engages, by means of a ball bearing 28, an elongate recess 29 of a toothed rack member 30. The elongate recess 29 extends transversely to the longitudinal dimension of the toothed rack member 30, so that the rotating crank motion of the crank pin 27 causes an oscillating motion of the toothed rack member 30 within the casing of the supporting body 2.

A linear bearing arrangement for the toothed rack member 30 is provided on the longitudinally extending side walls 32 and 33 of the casing. According to the embodiments of FIGS. 5 to 10, the longitudinally extending side walls 32 and 33 of the casing comprise guiding rails 34 and 35, which are engaged by longitudinally extending outer edges 36 and 37 of the toothed rack member 30, thereby ensuring a reliable guidance thereof on both sides.

The toothed rack member 30 comprises two oppositely oriented driving legs 38 and 39 which are offset to each other. At the inner edge 40 and 41, respectively, of these driving legs 38 and 39, respectively, there are provided groups 42 of gear teeth 43 arranged in a row which each mesh with a corresponding gear wheel 44 mounted on a journal 7. The journals 7 are supported in the upper casing plate 10 by means of slide bearings 45 and in the lower casing plate 46 by means of slide bearings 47, whereby the upper slide bearings 45 are situated in pocket holes. The lower, continuous bearing hole, however, has a downwardly or outwardly directed circular groove 48 which receives a sealing ring (not shown) adapted to tightly surround the journal 7.

Assembling of the soil loosening device 1 is quick and simple. For this purpose the toothed rack member 30 is slidingly inserted from one end of the upper casing plate 10 between the rigidly and integrally formed guiding rails 34 and 35 of the longitudinally extending side walls 32 and 33, and thereafter the journals 7 including the gear wheels 44 are inserted into the upper and lower slide bearings 45 and 47, respectively. Now it remains but to close the casing by assembling the upper casing plate 10 and the lower casing plate 46, whereby the gear wheels 44 engage the teeth 43 of the toothed rack member 30.

Mounting screws are inserted through holes 50 at the corners of the upper casing plate 10 and are screwed into threaded holes 51, which are situated in the shorter transverse side walls 52 and 53 of the casing, these side walls being integrally formed with the lower casing plate 46. The mounting of the coupling case 11 on the upper casing plate 10 is accomplished by means of mounting screws which penetrate holes 54 in the upper casing plate 10 and are screwed into threaded holes 55 in the bottom wall of the coupling case 11. Furthermore, a short coupling flange 56 provided on the coupling case 11 engages the central bore 57 of the upper casing plate by form-fit.

In use of the soil loosening device according to the invention, the pairwisely differently long soil loosening tool members 3 and 4 are pressed into the soil or they burrow themselves into the soil, under the influence of the weight of the driving unit 5 and of the supporting body 2, due to their arcuate pivotal motion around the geometric axis of the journals 7. Thereafter the supporting body 2 is displaced along the soil surface by manual pulling or pushing action to the handle 60, which has a rod-like shape and protrudes upwardly. Depending of the mounting position of the coupling case 13 and thereby of the driving unit 5 with reference to the supporting body 2, the journals 7 with the soil loosening tool members 3 and 4 fastened thereto in bifurcate arrangement and arranged in a row move either in the direction of said row for an intensive cultivation of the soil within a narrow area or transversely thereto for a less intensive cultivation of the soil in a wider area.

The pivoting motion of the soil loosening tool members 3 and 4, which takes place e.g. along a pivoting angle of 45° to 90°, ensures an essentially uniform loosening of the soil. The shorter soil loosening tool members 3 thereby effect a preloosening of the soil, which is intensified by the longer tool members 4. This diversification results in a lower driving effort while the soil is still deeply and uniformly loosened. As already mentioned, this is dependent on the choice of the moving direction of the device over the soil surface.

For the sake of guiding the supporting body 2 over the surface of the soil or in order to control the penetrating depth of the tool members 3 and 4, the supporting body preferably may comprise skids or wheels (not shown) which are height-adjustable.

Is is clearly evident from the foregoing description and the drawings that a soil loosening device according to the invention is very simple in design, has a sturdy mechanical construction and may be inexpensively manufactured due to the fact that it comprises but a few driven parts; it is therefore well suited for soil cultivation.

What I claim is:

1. An apparatus which loosens soil as it moves along the surface of the earth, said apparatus comprising:
   a hollow supporting body including a casing with an upper casing plate, a lower casing plate, two longitudinal casing side walls and two transverse casing side walls;
   soil loosening tool means rotatably mounted on said lower casing plate and protruding therefrom substantially perpendicularly, said loosening tool means including at least one bifurcate loosening tool comprising two tine-like tool members;
   driving means mounted on said upper casing plate for driving said soil loosening tool means to cause said tool means to displace the soil;
   gearing means mounted in the interior of said hollow supporting body including first gear members drivingly connected to said driving means, second gear members drivingly connected to said soil loosening tool means and transmitting means operatively connected to said first and said second gear members to transform a continuous rotary motion of said driving means into an oscillating angular motion of said soil loosening tool means;
   handling means including a handle connected to said driving means for guiding and moving the apparatus over the surface of the soil to be loosened;
   said transmitting means including a toothed rack member slidingly received in said hollow supporting body and adapted to be driven to an oscillating motion, said rack member having a base portion which is provided with an elongate recess therein and having at least one toothed driving leg extending perpendicularly to the axis of said elongate recess from said base portion;
   said first gear members including a crank shaft operatively connected to said driving means and incorporating a crank pin which engages said elongate recess, the rotating crank shaft thereby driving said rack member to an oscillating motion; and
   said second gear members including at least one gear wheel mounted on said soil loosening tool means and meshing with said toothed rack member.

2. An apparatus according to claim 1, in which said two longitudinal casing side walls each comprise two parallely extending rails protruding into the interior of said hollow supporting body, said rail pairs engaging the longitudinal side edges of said toothed rack member to slidingly support and guide the toothed rack member.

3. An apparatus according to claim 1, in which said soil loosening tool means comprise a tool support plate member receiving on its one side said bifurcate loosening tool and having on its other side a driving journal which is rotatably mounted in said lower casing plate, whereby said gear wheel is mounted on the end portion of said journal which protrudes into said supporting body.

4. An apparatus according to claim 3, in which said bifurcate loosening tool consists of two individual tool members of different length.

5. An apparatus according to claim 1, in which said driving means include a motorized driving unit to which said handle is fastened, and in which said upper casing plate and said motorized driving unit each include cooperating coupling means, whereby said driving unit, together with said handle, is releasably mountable on said upper casing plate in at least two different angular positions by means of said coupling means.

6. An apparatus which loosens soil as it moves along the surface of the earth, said apparatus comprising:
a hollow supporting body including a casing with an upper casing plate, a lower casing plate, two longitudinal casing side walls and two transverse casing side walls;
an even number of soil loosening tools rotatably mounted on said lower casing plate and protruding therefrom substantially perpendicularly, said loosening tools each comprising two tine-like tool members;
driving means mounted on said upper casing plate for driving a first one or a first group of said soil loosening tools to an oscillating angular motion in a first direction and a second one or a second group of said soil loosening tools to an oscillating motion in a second direction opposite to said first direction to cause said tools to displace the soil;
gearing means mounted in the interior of said hollow supporting body including first gear members drivingly connected to said driving means, second gear members drivingly connected to said soil loosening tools and transmitting means operatively connected to said first and said second gear members to transform a continuous rotary motion of said driving means into an oscillating angular motion of said soil loosening tools;
handling means including a handle connected to said driving means for guiding and moving the apparatus over the surface of the soil to be loosened;
said transmitting means including a toothed rack member slidingly received in said hollow supporting body and adapted to be driven to an oscillating motion, said rack member having a base portion which is provided with an elongate recess therein and having first and second driving legs extending perpendicularly to the axis of said elongate recess from said base portion and offset to each other in opposite directions, each of said first and second driving legs comprising at least one group of teeth arranged on oppositely directed edges thereof;
said first gear members including a crank shaft operatively connected to said driving means and incorporating a crank pin which engages said elongate recess, the rotating crank shaft thereby driving said rack member to an oscillating motion; and
said second gear members including gear wheels mounted on each of said soil loosening tools, said gear wheel of said first soil loosening tool or said gear wheels of said first group of soil loosening tools meshing with one of said teeth groups provided on said first driving leg and said gear wheel of said second soil loosening tool or said gear wheels of said second group of soil loosening tools meshing with the other one of said teeth groups provided on said second driving leg.

7. An apparatus according to claim 6, in which said two longitudinal casing side walls each comprise two parallely extending rails protruding into the interior of said hollow supporting body, said rail pairs engaging the longitudinal side edges of said toothed rack member to slidingly support and guide the toothed rack member.

8. An apparatus according to claim 6, in which each of said soil loosening tools comprises a tool support plate member receiving on its one side said two tool members and having on its other side a driving journal which is rotatably mounted in said lower casing plate, whereby said gear wheel is mounted on the end portion of said journal which protrudes into said supporting body.

9. An apparatus according to claim 8, in which said loosening tool members have different lengths.

10. An apparatus according to claim 6, in which said driving means include a motorized driving unit to which said handle is fastened, and in which said upper casing plate and said motorized driving unit each include cooperating coupling means, whereby said driving unit, together with said handle, is releasably mountable on said upper casing plate in at least two different angular positions by means of said coupling means.

11. An apparatus according to claim 6, in which four soil loosening tools are provided, which are arranged in a row and which are driven in pairs to an oppositely directed oscillating motion.

* * * * *